(12) United States Patent
Kim et al.

(10) Patent No.: US 11,693,750 B2
(45) Date of Patent: Jul. 4, 2023

(54) VIRTUAL DEVICE FOR PROVIDING TEST DATA

(71) Applicant: LG CNS CO., LTD., Seoul (KR)

(72) Inventors: Minji Kim, Seoul (KR); Do Yeon Kim, Seoul (KR); Yong Sik Kim, Seoul (KR); Jung Hwan Kim, Seoul (KR); Jin Ho Kim, Seoul (KR); Kyungbae Sohn, Gyeonggi-do (KR); Minsung Shin, Seoul (KR); Kang Hee Han, Seoul (KR); Heedae Hong, Seoul (KR)

(73) Assignee: LG CNS CO. LTD., Seoul (KR)

(*) Notice: Subject to any disclaimer, the term of this patent is extended or adjusted under 35 U.S.C. 154(b) by 0 days.

(21) Appl. No.: 17/557,697

(22) Filed: Dec. 21, 2021

(65) Prior Publication Data

US 2022/0206913 A1    Jun. 30, 2022

(30) Foreign Application Priority Data

Dec. 30, 2020  (KR) .................. 10-2020-0187839

(51) Int. Cl.
*G06F 11/00* (2006.01)
*G06F 11/22* (2006.01)
*G06F 11/273* (2006.01)
*G06F 11/30* (2006.01)
*G06F 11/07* (2006.01)
*G06F 11/263* (2006.01)

(52) U.S. Cl.
CPC ...... *G06F 11/2294* (2013.01); *G06F 11/0772* (2013.01); *G06F 11/263* (2013.01); *G06F 11/2733* (2013.01); *G06F 11/3006* (2013.01)

(58) Field of Classification Search
CPC ............ G06F 11/2294; G06F 11/0772; G06F 11/263; G06F 11/2733; G06F 11/3006; G06F 11/301; G06F 11/3684
See application file for complete search history.

(56) References Cited

U.S. PATENT DOCUMENTS 11,151,025 B1 * 10/2021 Gupta ................. G06F 11/3688
11,360,880 B1 * 6/2022 Arora ................. G06F 11/3688
2020/0050538 A1 * 2/2020 Schmalz, Jr. ....... G06F 11/3664

* cited by examiner

*Primary Examiner* — Joseph D Manoskey
(74) *Attorney, Agent, or Firm* — Ked & Associates, LLP

(57) ABSTRACT

A virtual device acquires a transaction history between a legacy computing device and a linked device; obtains a first request provided from the legacy computing device based on the transaction history and a first response received from the linked device in response to the first request; receives a second request corresponding to the first request from a new computing device and determines a second response to the second request; and provides test information for the new computing device based on a comparison of the first response and the second response.

18 Claims, 4 Drawing Sheets

VIRTUAL DEVICE FOR PROVIDING TEST DATA

CROSS-REFERENCE TO RELATED APPLICATION(S)

This application claims priority under 35 U.S.C. § 119 to Korean Application No. 10-2020-0187839, filed in Korea on Dec. 30, 2020, whose entire disclosure is hereby incorporated by reference.

BACKGROUND

1. Field

The present disclosure relates to a method for providing test data through a virtual device, and more specifically, to performing verification of a new computing system using prior transaction data.

2. Background

In general, when developing a computing system, a separate verification procedure is performed to check whether there are any defects or failures in the system. However, in conventional system development verification procedures, a developer or designer typically creates a verification case using arbitrary virtual data or a small amount of real data, thereby performing limited verification or using a large amount of real data. However, this process for verification disadvantageously requires the development of a conversion program for each task.

In addition, when performing an integrated verification of a computing system that includes multiple separate components, multiple users may operate separately to manually verify the separate components, and these verification tasks may be relatively time consuming and costly to ensure thorough verification of the developed computing system. At the same time, manpower for performing verification is generally limited such that In addition, in the case of outbound testing (e.g., testing data output from the computing system to multiple different internal or external recipients), there are cases in which a same response may be incorrectly given to different recipients because the developers do not know how to handle the internal workings of the legacy systems. Thus, the verification process may need separate test environments for the different legacy systems to ensure that the computing system generates appropriate different responses by individually writing programs according to the request contents. There may be many different legacy systems, and as test data was generated according to the test scenario written by the developer or tester for each test case, it may be difficult to verify the multiple test cases. Additionally, it may not be possible to test the requests in various cases occurring in the actual production environment. In order to overcome these limitations, when direct test interlocking with the system of the affiliated organization is planned, an accurate testing process may require a lot of time and cost to perform needed task, such as defining the test message and negotiating the test schedule.

Accordingly, in the overall transaction, the demand for development of a development system verification technology that enables a proactive response to a vast number of cases that may occur in a real environment is gradually increasing, and a method to solve the above-mentioned problems is urgently needed.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments of the present disclosure will be described in detail with reference to the accompanying drawings. However, the present disclosure may be implemented in several different forms and is not limited to the embodiments described herein.

Figure 1:
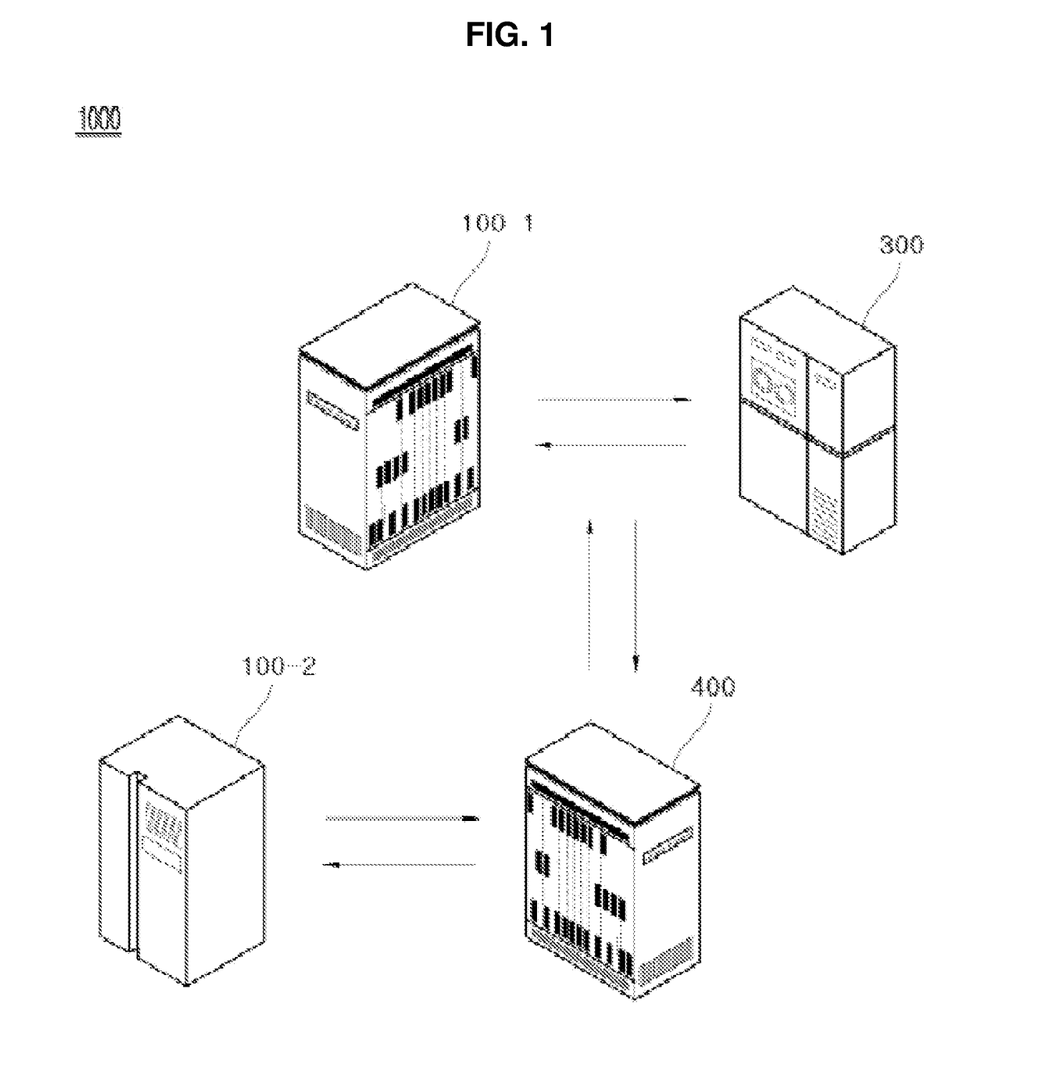
FIG. 1 is a diagram schematically illustrating a configuration of a system for providing test information according to an embodiment.

FIG. 1 is a diagram schematically illustrating a configuration of a system 1000 for providing test information according to an embodiment. Referring to FIG. 1, a system 1000 for providing test information according to an embodiment includes a legacy computing device 100-1, a new computing device 100-2, a linked device 300, and a virtual device 400. As used herein, computing devices 100-1, 100-2 may broadly refer to devices or systems that are developed to provide certain information and/or services, and linked device 300 may broadly refer to a device or system that requests a service or information from the legacy computing device 100-1. For example, computing devices 100-1, 100-2 may refer to devices that offer similar services or information to different users, or devices that offer different servicers or information to a similar user. The legacy computing device 100-1 may broadly refer to a device or system that has previously been developed, while new computing device 100-2 may broadly refer to a device or system that is being developed. The virtual device 400 may broadly refer to a device or system for acquiring and processing data related to an interaction between legacy computing device 100-1 and linked device 300 and to test the new computing device 100-2.

Two or more of the legacy computing device 100-1, the new computing device 100-2, the linked device 300, or the virtual device 400 may be connected through a network. As would be understood in the field of computer networking, the network may be configured using various communication technologies and devices, such as a wired and/or wireless network and may include at least one of a local area network (LAN), a metropolitan area network (MAN), or a wide area network (WAN). Additionally, the network may include various communication networks.

The virtual device 400 may obtain data related to a transaction history between the legacy computing device 100-1 and the linked device 300. In one embodiment, the virtual device 400 may store and manage data related to a transaction between the legacy computing device 100-1 and the linked device 300. For example, the virtual device may update or implement a database 200 or other memory structure to store the transaction history data. In certain examples, the database 200 may store data related to the transaction, such as a transaction message including a request provided from the legacy computing device 100-1 to the linked device 300 and a response provided from the linked device 300 to the legacy computing device 100-1 in response to the request. In an embodiment, the transaction history may additionally or alternatively include, for example, a user input transmitted and received during a request or response process and/or a transaction with a related institution server (not shown) or other data exchanged between a third party and at least one of more of the linked device 300 or the legacy computing device 100-1 in connection with the first request and the first response. For example, the database 200 may store transaction data transmitted and received by the legacy computing device 100-1 and/or the linked device 300 in an actual operating environment.

As described in greater detail below, the virtual companion device 400 may acquire test information about the new computing device 100-2 based on the transaction history between the legacy computing device 100-1 and the linked device 300. For example, the legacy computing device 100-1 may correspond to an existing business system being used by the first company, and the new computing device 100-2 may correspond to a new system for the first company or a system for second company. In another example, the new computing device 100-2 may be associated with switching services from the legacy computing device 100-1 to the next-generation business system. The new computing device 100-2 may corresponds to a new system being developed, and the linked device 300 may correspond to a linked institution system that is connected to the legacy computing device 100-1 to exchange transaction messages.

In this case, in order to perform a test on an outbound transaction representing a transaction in which the legacy business system transmits a request message to the associated organization system and receives a response message, communication with the linked device 300 as the associated organization system is generally used. However, since the related art device 300 is already connected to the legacy computing device 100-1, it may be difficult to configure an environment for testing outbound transactions. Accordingly, the virtual device 400 stores a transaction message between the legacy computing device 100-1 and the linked device 300, and the virtual device 400 may generate test data for the new computing device 100-2 based on the stored transaction message.

The outbound test for the new computing device 100-2 may be performed by the virtual device 400 functioning as a virtual association system that provides an appropriate response message to the request message received from new computing device 100-2. Accordingly, by applying the transaction history for outbound transactions between the legacy computing device 100-1 and the linked device 300, as stored in the database 200, to the new computing device 100-2, the virtual device 400 may reproduce the past outbound transactions to simulate an interaction reproduced between the new computing device 100-2 and the virtual device 400. In this reproduction process, it can be determined whether an appropriate response is obtained in response to the request of the new computing device 100-2. Accordingly, it is possible to generate test information on whether the outbound transaction is operating properly at the request of the new computing device 100-2. Detailed information on this testing process will be described later with reference to FIGS. 2 to 4.

In an embodiment, the virtual device 400 may be understood as including a server or computing device operating through a computer program for realizing the functions described herein. The database 200 may be a component of or implemented by the virtual device 400 and may store a transaction history between the legacy computing device 100-1 and the linked device 300. In one embodiment, the legacy computing device 100-1 may store the transaction history received from, or, in another embodiment, capture network packets transmitted and received between the legacy computing device 100-1 and the linked device 300, and/or obtain and store a transaction message using a log file and manage. In another example, the database 200 is maintained separately from the virtual device 400 or its associated components.

The linked device 300 is a device (e.g., an existing association system) that is an outbound transaction target of the new computing device 100-2. In one embodiment, the legacy computing device 100-1 previously communicated with the linked device 300 before transaction data collection by the virtual device 400. Although the transaction was transmitted and received with the legacy computing device 100-1 corresponding to the transaction target, the transaction may not be easily available because the current operation may have previously completed or stopped (e.g., the legacy computing device 100-1 is no longer active).

The virtual device 400 is a device (e.g., a virtual association system) that is a virtual outbound transaction target of the new computing device 100-2 and, in one embodiment, is associated with the legacy computing device 100-1, When a request is received from the new computing device 100-2 by simulating the linked device 300 as an outbound transaction target of the new computing device 100-2 according to a pre-stored algorithm based on the transaction history between the devices 300, test data from the virtual device 400 may trigger the new computing device 100-2 to transmit a response to the request. In an embodiment, the legacy computing device 100-1 and the new computing device 100-2 may be implemented as servers or other computing devices, respectively, and may be understood as, for example, a legacy server and new server, respectively, throughout the specification.

In one embodiment, the system 1000 for providing test information may include the legacy computing device 100-1, the database 200, the linked device 300, and the virtual device 400. It should be appreciated that other configurations are contemplated, such as the linked device 300 and virtual device 400 being implemented as a common device or system, or the legacy computer device 100-1 and the new computing device 100-2 being implemented as modules of a common device or system. In another example, the system 1000 may include the new computing device 100-2, the database 200, and the virtual device 400. For example, when the legacy computing device 100-1, which is the legacy business system, does not exist (e.g., there is no prior system or prior transaction records available), the new computing device corresponding to a simulation of an outbound transaction between 100-2 and the virtual device 400 may be used. Hereinafter, the description is focused on the above-described embodiment, but is not limited thereto, and is implemented in various forms, such as a simulation being performed when both the legacy computing device 100-1 and the new computing device 100-2 are present.

In addition, other general-purpose components other than those shown in FIG. 1 may be further included in the system 1000 for providing test information. For example, at least one of the legacy computing device 100-1 or the new computing device 100-2 may further include various other terminals or servers for transmitting and receiving transactions for specific business purposes.

Figure 2:
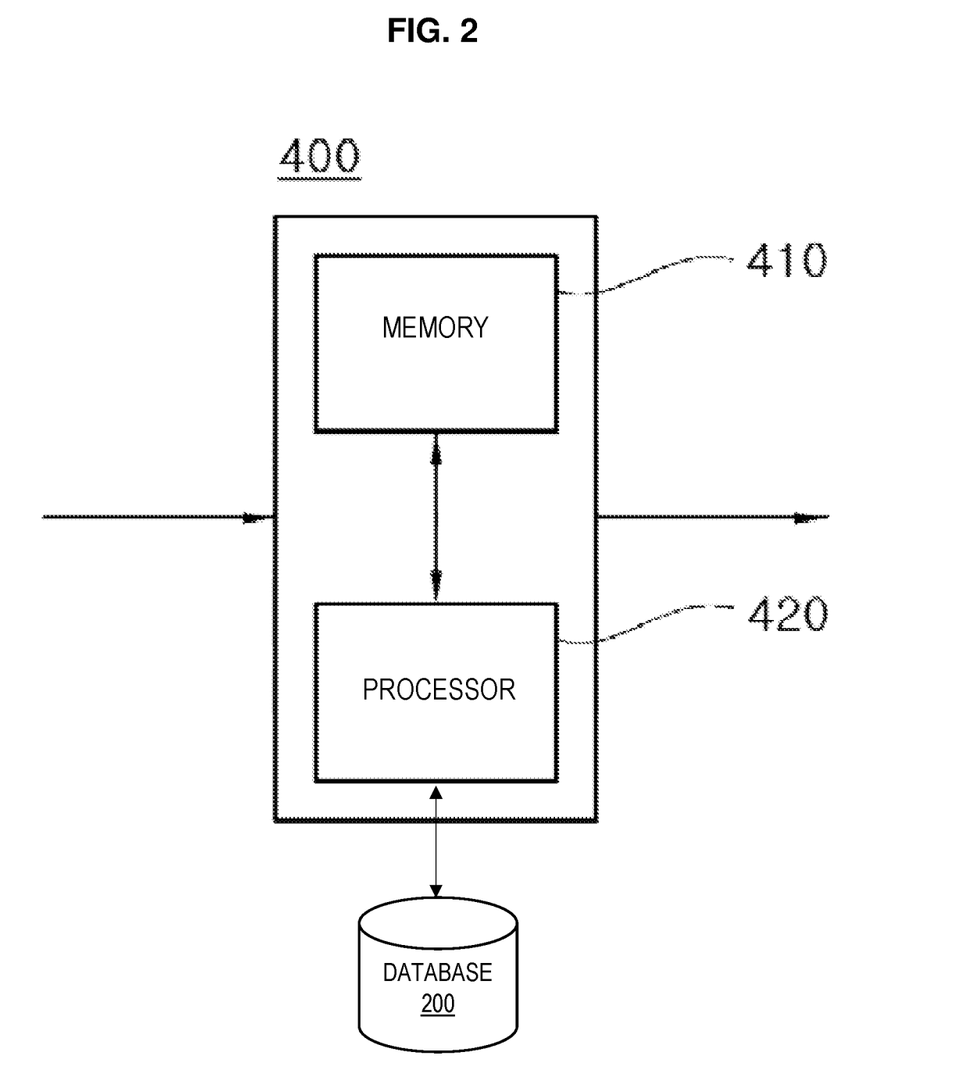
FIG. 2 is a block diagram illustrating a configuration of a virtual device according to an embodiment.

FIG. 2 is a block diagram illustrating a configuration of a virtual device 400 according to an embodiment. Referring to FIG. 2, the virtual device 400 may include a memory 410 and a processor 420 to provide various functions, such as to provide database 200.

The virtual device 400 according to an embodiment includes a memory 410 for storing a transaction history between the legacy computing device 100-1 and the linked device 300 (e.g., in database 200). The memory 410 may further store a first request provided from the legacy computing device 100-1 and a first response received from the linked device 300 in response to the first request based on the transaction history, and a second response corresponding to the first request. A request is obtained from the new computing device 100-2 to obtain a second response corresponding to the second request, and test information about the new computing device 100-2 is obtained based on a comparison result of the first response and the second response.

In an embodiment, the memory 410 may be an auxiliary storage device implemented as a non-volatile memory such as a solid-state disk (SSD) or a hard disk drive (HDD) capable of storing information necessary for the overall operation of the virtual device 400. Alternatively, the memory 410 may include a main memory implemented as a volatile memory such as random-access memory (RAM). In addition, in an embodiment, the memory 410 may include the database 200 and may be implemented as a separate storage server to store a transaction history between the legacy computing device 100-1 and the linked device 300 through a wired/wireless communication network and may provide a storage space for collecting the transaction data.

In an embodiment, the processor 420 may perform a series of operations for providing test information and may be implemented as a central processor unit (CPU) that controls the overall operation of the virtual device 400, and memory 410 and other components may be electrically connected to control data flow therebetween. For example, the processor 420 may implement instructions stored on the memory 410.

In addition, those of ordinary skill in the related technical arts would understand that other general-purpose components other than those shown in FIG. 2 may be further included in the virtual device 400. For example, the virtual device 400 may further include a communication device for communicating with another device (e.g., a terminal or a server) through a network, an input/output interface for receiving a user input or outputting information, and the like.

Figure 3:
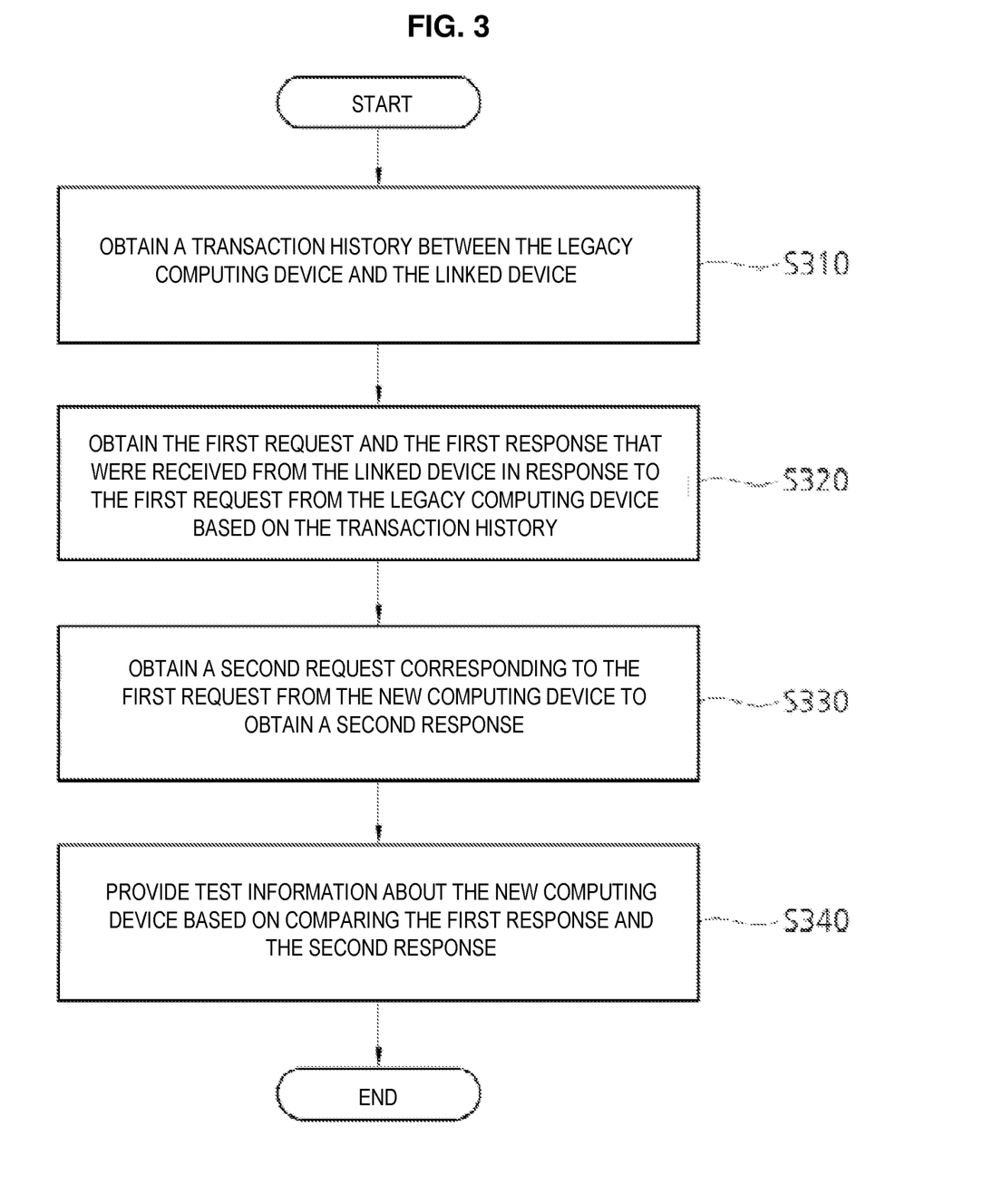
FIG. 3 is a flowchart illustrating a method of providing test information by a virtual device according to an embodiment.

FIG. 3 is a flowchart illustrating a method of providing test information by the virtual device 400 according to an embodiment. Referring to FIG. 3, in step S310, the virtual device 400 may obtain a transaction history between the legacy computing device 100-1 and the linked device 300. In an embodiment, the transaction history includes a request (e.g., the "first request") provided from the legacy computing device 100-1 to the linked device 300 and a transaction message including a response (e.g., the "first response") received from the linked device 300 in response to the request.

In one embodiment, the virtual device 400 operates to use a specific transaction between the legacy computing device 100-1 and the linked device 300 in an actual operating environment (e.g., the virtual device 400 evaluates a connection between the legacy computing device 100-1 and the linked device 300). For example, the virtual device 400 It may capture a network packet exchanged between the legacy computing device 100-1 and the linked device 300, the virtual device 400 may convert the captured packet into a flow unit transaction message including a request and a response. The virtual device 400 may then store and manage the request, response, and message identifier in the database 200.

For example, the virtual device 400 may perform a transaction according to a user input and a user input requesting a transaction from the terminal in relation to an actual outbound transaction that occurs in an actual operating environment of the legacy computing device 100-1. In order to do this transaction, the request transmitted to the related device 300 and the response received from the related device 300 through a transaction with one or more related organizations (e.g., credit companies, shipping companies, etc.) servers according to the request are included. In this way, the entire transaction data related to the transaction can be collected and recorded in the database 200, and data may be collected for database 200 whenever transactions occur (or during a preset period) between the legacy computing device 100-1 and the linked device. For example, a transaction history between legacy computing device 100-1 and linked device 300 may be continuously collected and managed in the database 200.

In an embodiment, the transaction message may further include information for encryption and/or decryption of a portion of at least one of system information (e.g., association information), the request, or the response. For example, each transaction message may further include information for encryption or decryption used in the transmission/reception process, such as common header information corresponding to request, response, source/destination internet protocol (IP) address, transmission control protocol (TCP) port, message protocol, message length, etc. Accordingly, in the process of obtaining or using the request and response in step 310, the virtual device 400 may additionally perform decrypting and/or encrypting of at least one of the request or response based on the information from the transaction message.

In step S320, the virtual device 400 may use the transaction history to obtain data related to the first request from the legacy computing device 100-1 and the first response that received from the linked device 300 in reply to the first request. For example, the virtual device 400 may use the transaction history to determine the first request transmitted by the legacy computing device 100-1 to the linked device 300 and enable the linked device 300 to respond to the first request. The virtual device 400 may then obtain the first response transmitted by the linked device 300 to the legacy computing device 100-1 and manage the first request and the first response through an associated identifier. As described in greater detail below, the virtual device 400 may then perform an outbound test on the new computing device 100-2 using testing test data determined based on the first request and first response. For example, when a user input requesting performance of a test is received, the virtual device 400 may extract an identifier from the request, and the virtual device 400 may retrieve a response in a stored legacy outbound transaction corresponding to the request from the database 200 using the extracted identifier.

In an embodiment, the first request and the first response may include a plurality of requests and a plurality of responses, respectively. In an embodiment, the first request may include a plurality of requests transmitted from the legacy computing device 100-1 to the linked device 300 during a preset period in the past (e.g., during a specific day or other set time period), and the first response may include a plurality of responses to the plurality of requests received from the linked device 300 in the legacy computing device 100-1 during the corresponding time period. For example, the virtual device 400 may respond to requests sent from the legacy computing device 100-1 to the linked device 300 during a specific past day according to a user input to the new computing device 100-2. When performing a test of the new computing device 100-2, the test data may correspond to all requests transmitted from the legacy computing device 100-1 to the linked device 300 for the specified day from the transaction history, and corresponding responses received from the linked device 300 in reply to these requests during the specific day. For example, all responses transmitted to the legacy computing device 100-1 during the specific day may be extracted.

In an embodiment, the virtual device 400 may acquire text included in or otherwise associated with the first request according to a preset format. In an embodiment, the full text may include at least one of a number stream in which numbers are consecutively listed or a character stream in which characters are listed according to the digit and position codes defined in the text interface. For example, the extracted text may include the numbers listed in the text of the first request. In one example, the first M digits may correspond to the request code (e.g., remittance, payment, etc.), the next N digits may correspond to the user identifier, and the next O digits may correspond to an account number. In an embodiment, the message in the first request may be determined based on a pre-stored first message interface for the legacy computing device 100-1 or the linked device 300.

In an embodiment, the first request may include at least one of internet protocol (IP) information and port information indicating the linked device 300, a business field indicated by the first request, and unique information indicating the second request. In an embodiment, the IP information may include source and/or destination IP addresses, the port information may include transmission control protocol (TCP) information used internally by an organization. Additionally, different values may be assigned to IP information and port information for each organization. In an embodiment, the business field may include a business code for identifying a business type (e.g., remittance, payment, etc.) of the first request, and the business field may include, for example, a unique serial number for each type of business used by financial institution. In one embodiment, the unique information may include a unique identification key designated to identify the first request.

In one embodiment, the virtual device 400 obtains a first request from the transaction history, obtains IP information, port information, business field and unique information from the first request, IP information, port information, business field, and then the virtual device 4000 obtains the first response to the first request from the transaction history by the matching key determined using the unique information. For example, the virtual device 400 may store and manage the first request and the first response transmitted and received between the legacy computing device 100-1 and the linked device 300 in the database 200. The virtual device 400 may then extract the IP address, port information, numbers in the preset specific digits in the text, and the work key of the work field from the first request, determine a unique matching key linking them, and use the matching key to match the first request with the first request. Data related to the first response may be stored and managed in the database 200. Accordingly, when performing a test on the new computing device 100-2, the virtual device 400 may identify a corresponding first request by the legacy computing device 100-1 and obtain data regarding the first request and an associated response from the database 200. For example, by extracting meaningful identification information from the first request, a matching key may be found, and a response matching the first request may be retrieved from the database 200 through the matching key.

In step S330, the virtual device 400 may obtain a second request corresponding to the first request from the new computing device 100-2 and obtain a second response. In an embodiment, the virtual device 400 may receive a second request for an outbound test from the new computing device 100-2 that reproduces the transaction as a test under substantially same requirements as the legacy transaction between the legacy computing device 100-1 and the linked device. A matching key can be extracted from the first request in a similar manner as previously described, and a corresponding response (e.g., a first response) associated with the matching key can be obtained from the database 200 and obtained as a second response. Furthermore, the second response may be converted according to the structure and format defined by the new computing device 100-2 and transmitted to the new computing device 100-2 to prepare an actual transaction-based test.

In an embodiment, the virtual device 400 may convert the first response into a second response according to a format corresponding to the new computing device 100-2 based on the message interface. The first request received from the computing device 100-2 may be converted into a second request based on the message interface. In one embodiment, the message in the first response is determined based on a first message interface of the first format corresponding to the legacy computing device 100-1 or the linked device 300, and the message in the second response is determined based on the second text interface of the second format corresponding to the new computing device 100-2. In another example, the second response may be determined based an interface change of the association system stored in the virtual device 400, and the first and second text interfaces may be different from each other.

For example, the virtual device 400 may obtain form information including a second message interface defining the full text of the new computing device 100-2 through a user input, and the virtual device 400 may obtain format information including the second text interface and the legacy computing device 100-1 by comparing the pre-stored first text interface that defines the text of the second response and rule information for format conversion (e.g., digit change, code addition, digit content change, value change corresponding to field name, field name change, etc.). The virtual device 400 may generate the second response by changing parts of the full text of the first response according to rule information to suit the new computing device 100-2.

In one embodiment, the virtual device 400 obtains IP information and port information indicating the new computing device 100-2 from the second request, determines the business field indicated by the second request from the second request. Unique information indicating the second request may be obtained from the second request. For example, IP address, port information, numbers in a preset specific digit in the text, work key of a work field, etc. can be extracted from the second request. In an embodiment, one or more of the IP information, port information, task field, or unique information for the second request may correspond, respectively, to IP information, port information, task field and unique information obtained from the first request. In another example, one or more of the IP information, port information, task field, or unique information for the second request may differ from corresponding information in the second request. For example, the virtual device 400 may store data to convert the one or more aspects of the first request to the second request to conform to testing requirements for the new computing device 100-2.

In an embodiment, the virtual device 400 may obtain the second response based on the IP information, port information, business field, and unique information obtained from the second request. For example, the virtual device 400 may determine a matching key using the IP information, port information, work field, and unique information extracted from the second request from the database 200 through the matching key. The second response may be generated based on the first response, and the second response may be applied to the new computing device 100-2.

In operation S340, the virtual device 400 may provide test information about the new computing device 100-2 based on a comparison result of the first response and the second response. In one embodiment, the virtual device 400 converts the message response by the linked device 300 to the message structure and format defined by the new computing device 100-2 for comparison of the first response and the second response. For example, after converting the first response by performing character set conversion, URL decoding, BASE64 decoding, decoding, message identifier (ID) extraction and mapping, message item mapping and conversion, etc., the converted first response and the second response. By comparing the first and second responses, the virtual device 400 may conduct a test based on real transactions from the first request(s) and first response(s).

In an embodiment, the virtual device 400 obtains a plurality of first result values indicated by the first response and a plurality of second result values indicated by the second response, and the virtual device 400 may determine difference between the first result values and the second result values. It is possible to obtain test information determined based on the type of the result value and a size of any error. For example, the virtual device 400 may obtain data associated with a first request transmitted from the legacy computing device 100-1 to the linked device 300 during a specific period in the past (e.g., during a specific day) according to the above-described steps. The virtual device 400 may convert the first request data to form second request data, and the second request data may include requests that have been made by the new computing device 100-2.

The virtual device 400 may use the second request to obtain the second response and to evaluate whether a subsequent transaction generated according to the second response of the new computing device 100-2 has been successfully processed, and whether the second response is consistent with the first response of the linked device 300. The virtual device may generate test information related to a response or request by analyzing a field type that has a difference by more than a preset value, a parameter value difference, etc. In one embodiment, the test information may include the final success or failure of the second request and second response, and information regarding the message processing that was used for testing through message conversion processing using the first, legacy request and the first legacy response.

In an embodiment, the virtual device 400 compares the second response (or the second request) with the first response (or the first request) converted into a format corresponding to the new computing device 100-2. Based on the test information for the new computing device 100-2, it is possible to obtain test information, such as rule information used to convert the first request into the second request (e.g., change the number of digits, add a code, change the content by number of digits) etc.) to convert the first response into a form corresponding to the second response, and compare the converted first response with the second response to compare and analyze the degree of mutual difference between the values of fields and parameters for each location can do.

In an embodiment, the virtual device 400 may store detailed error information regarding a transaction in which an error exceeding a preset value has occurred according to the comparison result, and the detailed error information may reflect the state of the corresponding message in the database 200. In an embodiment, the database 200 may be include preprocessing, during processing, or post processing data analysis and messaging.

In an embodiment, the virtual device 400 may categorize the first result value according to characteristics of the linked device 300 and compare the first result value and the second result value by category. For example, the first response and the second response may each include a plurality of responses, and each response may be expressed in any one of a plurality of preset categories. For instance, the first result value and the second result value may be classified according to a plurality of categories (e.g., insurance type, maturity year, subscriber age, etc.) set in relation to a company (e.g., an insurance company), and the first result value and the second result value in each category may be compared such that differences in values can be calculated.

In an embodiment, the virtual device 400 may obtain an importance weight for each category and may acquire test information based on the importance weight and a comparison result for each category. For example, a plurality of categories and importance weights for each category may be set to different values according to the type of institution (e.g., insurance company, bank company, card company, etc.) corresponding to the linked device 300. The virtual linkage device 400 may then calculate a test score according to the summation result by reflecting the importance weight on the difference between the first result value and the second result value for each category.

In an embodiment, the importance weight may be determined according to the frequency of occurrence for each category appearing in the second result value. For example, when the linked device 300 is a bank server, various transactions such as remittance, payment, loan, etc. may occur, and the frequency of occurrence of the category "balance" among them may be higher than a preset value. In this case, the virtual device 400 assigns the highest importance weight to the category of "balance" with the highest frequency of occurrence or assigns a weight proportional to the frequency of occurrence to one or more categories whose frequency of occurrence is higher than a preset level to calculate the test score.

In an embodiment, when the difference between the first result value and the second result value is greater than or equal to a preset first value, the virtual device 400 assigns a first importance weight to certain categories, and the frequency of occurrence for each category may be set to a preset second value. In other examples, the virtual device may assign a second importance weight to certain categories, while a third importance weight is given to one or more specific categories determined as a major category according to the characteristics of the related art device 300. The test score may be calculated based on the first to third importance weights. For example, the first importance weight may be greater than the second importance weight, and the second importance weight may be greater than the third importance weight. In one embodiment, when reviewing all transactions over a certain period of time (for example, one day), it may be difficult to see that the transactions for one day are successful only if they are 100% identical, so a method for comparing some non-identical cases, such as using different weights, may be used.

In one embodiment, the virtual device 400 may determine that the test for the new computing device 100-2 has failed if the test score is less than a first value, and the virtual device 400 may indicate that the test has a critical error if the test score is less than a second value that is less than the first value. A warning message can be outputted together with test information.

According to an embodiment of the present invention, the virtual device 400 does not create a large amount of test cases, when the linked device 300 is no longer communicating with the legacy computing device 100-1. Instead, the virtual device 400, rather than making a large amount of test cases, uses a small number (e.g., less than 100, less than 10, or less than 5) of past transactions that can be reproduced in the new computing device 100-2, and the virtual device 400 can verify whether the new computing device 100-2 properly requests, whether the virtual device 400 appropriately responds to the request, etc. In addition, according to the request of the new computing device 100-2, the virtual device 400 can simulate an actual transaction as if there is an actual transaction with an external device, so that the outbound transaction of the new computing device 100-2 in the virtual environment based on the real transaction can be effectively simulated.

Figure 4:
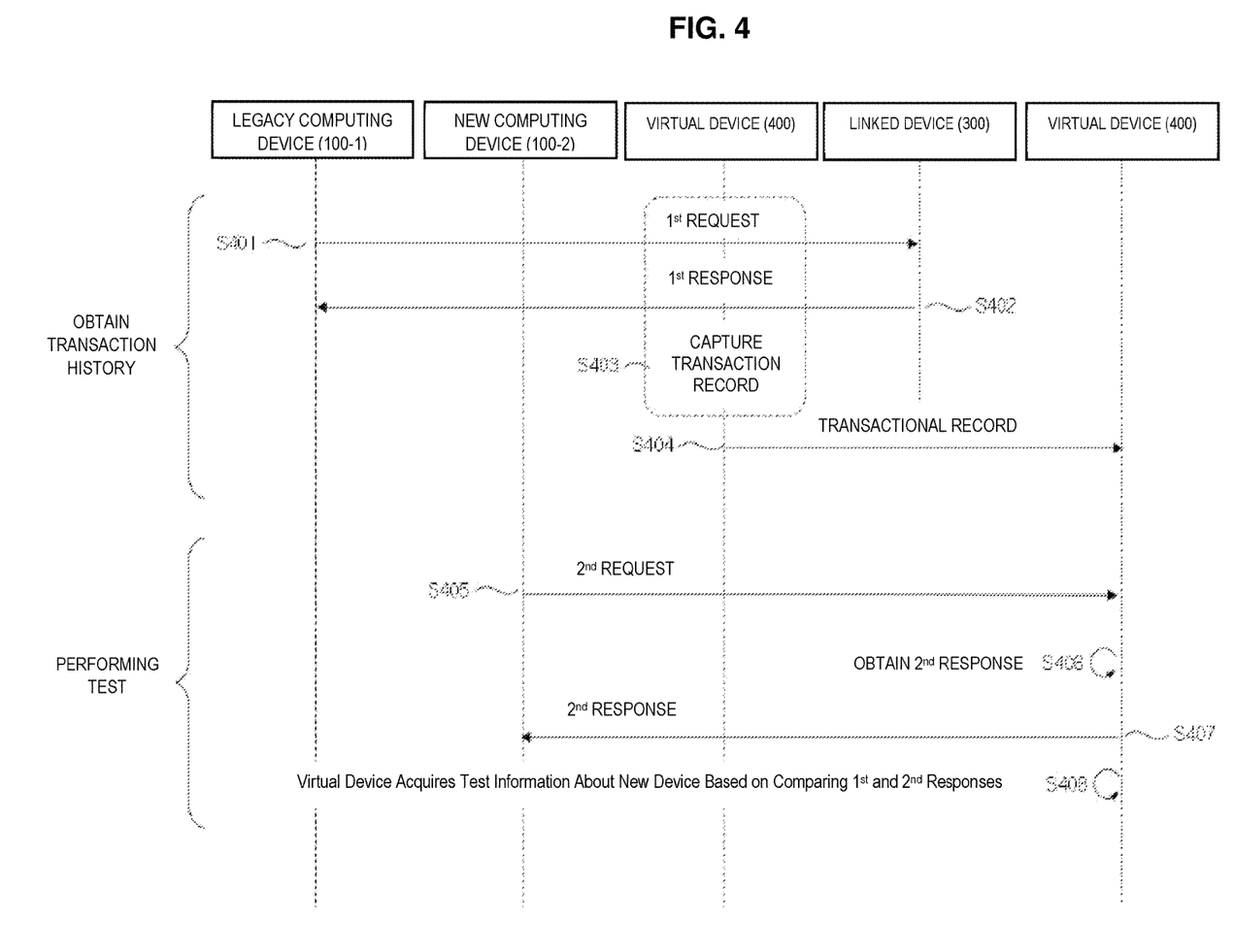
FIG. 4 is a flowchart illustrating a method for providing test information by a system for providing test information according to an exemplary embodiment.

FIG. 4 is a flowchart illustrating a method for providing test information by the system 1000 for providing test information according to an exemplary embodiment. Referring to FIG. 4, in steps S401 to S403, the virtual device 400 may store the transaction history between the legacy computing device 100-1 and the linked device 300 in the database 200. In FIG. 4, each step is illustrated according to an embodiment in which the virtual device 400 initially operates as an intermediate observer (e.g., a listening node) to obtain a transaction history, and then secondarily communicates with new computing device 100-2 to perform a test using the transaction history, but the illustrated method is not limited thereto. Each operation may be performed in the same virtual device 400 that does not require message transmission between internal components, or each operation may be performed by dividing it in a plurality of servers included in one or more of the virtual device(s) 400. For example, separate virtual devices 400 may perform, respectively, the collection of the transaction history between the legacy computing device 100-1 and the linked device 300, and the testing of the new computing device 100-2 based on the transaction history.

In step S401, the legacy computing device 100-1 may transmit a first request to the linked device 300 in the context of an actual transaction process, and in step S402, the legacy computing device 100-1 may receive a first response to the first request from the linked device 300. For example, in the case of an outbound transaction, the first request is transmitted from the legacy computing device 100-1, which is a legacy business system, to the linked device 300, which is a linked institution server, and the linked device 300 provide the first responds to the first request.

In step S403, the transaction packet or log file may be captured by the virtual device 400, and the captured data may be converted into first request and first response data and stored as a captured transaction record in the database 200. For example, in step S403, the virtual device 400 may capture a transaction between the legacy computing device 100-1 and the linked device 300 using a transaction packet or a log file to determine the first request and the first response.

In step S404, the virtual device 400 transfers the generated transaction data, including data related to the first request and the first response to the database 200. After that, as similar steps are repeated by the virtual device 400 in the operating environment, additional transaction data according to actual transactions between the legacy computing device 100-1 and the linked device 300 may be continuously collected in the database 200.

In one embodiment, the virtual device 400 matches by combining IP information, port information, work field and unique information extracted from the first request transmitted from the legacy computing device 100-1 to the linked device 300. The virtual device 400 may generate a key and manage a matching relationship between the first request and the first response stored in the database 200 through the matching key.

In steps S405 to S408, when the legacy computing device 100-1 and/or the linked device 300 is no longer being monitored or based on the test environment established for outbound testing, the virtual device 400 may perform a test on the new computing device 100-2, which is a new business system, based on the transaction history between the legacy computing device 100-1 and the related art device 300.

In step S405, the virtual device 400 may receive the second request from the new computing device 100-2, and for example, reproduce the test target transaction in the new computing device 100-2 under the same requirements as the legacy transaction. Accordingly, the second request may be transmitted to the virtual device 400. Although omitted in FIG. 4 for convenience of explanation for the outbound test, the second request obtained from the first request stored in the database 200 is transmitted from the virtual device 400 to the new computing device 100-2 according to an embodiment. In another embodiment, the virtual device 400 may perform an inbound test is performed based on the transaction history and without having received the second request from the new computing device 100-2.

In step S406, the virtual device 400 may obtain a response corresponding to the second request and obtain the second response through transformation using, for example, a matching key from the identification information extracted from the second request. The virtual device 400 may determine a response corresponding to the matching key is inquired from among a plurality of responses stored in the database 200, and when a conversion process is used, a second response can be obtained by converting the inquired response according to the professional interface.

In step S407, the virtual device 400 may apply the second response to the new computing device 100-2. In step S408, the virtual device 400 may acquire test information about the new computing device 100-2 based on the comparison result of the first response and the second response. For example, a comparative analysis between the legacy computing device 100-1 and the new computing device 100-2 may be performed through the second response transmitted from the virtual device 400 to the new computing device 100-2. After converting the first response into a format corresponding to the new computing device 100-2, it is possible to compare and analyze the legacy computing device 100-1 and the new computing device 100-1 system by analyzing the second response and/or comparing the first request and the second request. In addition, it is also possible to test the follow-up transaction that occurs according to the second response. For example, the virtual device 400 may determine whether the second response of the new computing device 100-1 is successfully processed according to the second request, whether the second response is consistent with the first response of the linked device 300. The virtual device 400 may create test information including comparison analysis results on whether the request is mutually identical by comparing it with the first request of the legacy computing device 100-1, and if different, the type of field with a difference greater than or equal to a preset value, difference in parameter values, etc. can be recorded and displayed.

According to one example, the system 1000 may be used in the context of a loan application and loan review transaction process. For example, when a user requests a loan application transaction, the legacy computing device 100-1 may process an internal logic and sends an outbound transaction related to the examination application to the examination agency request to receive a response to the examination result from the linked device 300 as the examination organization. At this time, the virtual device 400 captures the transaction between the legacy computing device 100-1 and the linked device 300, stores a transaction message including the request and the response in the database 200, and performs the transaction. Identifiable message identifiers (e.g., matching key, unique information, etc.) can be stored and managed together.

Thereafter, the new computing device 100-2 reproduces the transaction under the same requirements as the legacy transaction between the legacy computing device 100-1 and the linked device 300 for an outbound test for the linked device 300, thereby reproducing the conventional association The second request may be transmitted to the virtual device 400 instead of the linked device 300, and the virtual device 400 generates a matching key using the identification information extracted from the received second request and stores the matching key in the database 200. The second response corresponding to the second request may be obtained, and the test may be performed by comparing the second response with the first response. Without the second response, the same first response from the linked device 300 may be received.

In addition, after the examination request transaction test, the virtual device 400 can check for situations that require additional analysis other than the normally processed transaction, and compares the message identifier (e.g., matching key) based on the pre-stored real transaction data to create a new response. The computing device 100-2 may check the non-generated review transaction message to analyze why it did not occur in the new computing device 100-2.

Also, when the real transaction message for which the test is requested is obtained without being stored in the database 200, the virtual device 400 may provide a comparison result for the condition in which the request is received. For example, in the case of an examination request transaction that is not stored in the database 200 but is input to the new computing device 100-2, under what conditions the request is received differently from the legacy computing device 100-1, the legacy computing device 100 is analyzed. A comparison result between the responses of the legacy computing device 100-1 and the new computing device 100-2 may be generated.

Accordingly, when a test on outbound transactions of the new computing device 100-2, such as the test the development of a new business system or a change in the affiliated institution system, the virtual device 400 may be used with the legacy computing device 100-1 and the conventional computing device 100-1. The virtual device 400 generates output for the new computing device 100-2 in a manner that simulates the operation of the linked device 300 based on actual transaction data with the linked device 300 and transmits a response corresponding to the request of the new computing device 100-2 to test the functioning of the new computing device 100-2.

It should be appreciated that the order and combination of the steps shown above is merely an embodiment of the present disclosure, and the order, combination, branch, function and the performing subject may vary to be implemented with addition, fewer, or different steps while not deviating from the essential characteristics of each component described in the specification.

Meanwhile, the above-described method can be written as a program that can be executed on a computer and can be implemented in a general-purpose digital computer that operates the program using a computer-readable recording medium. In addition, the structure of the data used in the above-described method may be recorded in a computer-readable recording medium through various means. The computer-readable recording medium includes a storage medium such as a magnetic storage medium (e.g., ROM, RAM, USB, floppy disk, hard disk, etc.) and an optically readable medium (e.g., CD-ROM, DVD, etc.) do.

Aspects of the present disclosure solve the problems of the prior art described above by performing verification using a transaction occurring in a real transaction environment to enabling a test for outbound transactions using virtual devices and related systems. In addition, testing can be carried out regardless of time or message type, so the testing is effective and efficient in terms of burden, cost and time for coordinating the system and schedule required in the test process, and it is possible to automate responses to outbound requests. Therefore, the scope of tasks subject to automated testing may be expanded.

In addition, as the test is performed using the real transaction message, the same result as opening the corresponding business function in advance without exposing the test information to real users can be obtained, and even those without business knowledge after the test can use the conventional server. It is possible to easily check whether the generated message is similarly processed in the current server, whether it remains unprocessed, or whether there is an additional transaction, so that the test result can be judged immediately. The present disclosure is not limited to the above aspects and additional aspects described below, and it should be understood additional aspects can be inferred from the configuration described in the detailed description or claims of the present disclosure.

According to a first aspect of the present disclosure, a method for a virtual device to provide test information includes: acquiring a transaction history between an legacy computing device and a linked device; obtaining a first request provided from the legacy computing device based on the transaction history and a first response received from the linked device in response to the first request; obtaining a second request corresponding to the first request from a new computing device to obtain a second response corresponding to the second request; and providing test information on the new computing device based on a comparison result of the first response and the second response, the first request including full text including text listed according to a preset format.

In addition, obtaining the second response may include: obtaining IP information and port information indicating the virtual device from the second request; determining, from the second request, a business field indicated by the second request; obtaining unique information representing the second request from the second request; and obtaining the second response based on the IP information, the port information, the work field, and the unique information. Also, the first request may include a request transmitted from the legacy computing device to the linked device during a preset period in the past.

The providing of the test information may include: obtaining a plurality of first result values indicated by the first response and a plurality of second result values indicated by the second response; and obtaining the test information determined based on a type and an error size of a different result value among the first result value and the second result value.

In addition, the obtaining of the test information may include: categorizing the first result value according to characteristics of the related art device; comparing the first result value and the second result value by category; obtaining an importance weight determined for each category; and obtaining the test information based on the importance weight and the comparison result for each category. In addition, the importance weight may be determined according to the frequency of occurrence for each category appearing in the second result value.

In addition, the obtaining of the test information may include: determining a test score by using a different importance weight determined for each category and a difference between the first result value and the second result value calculated for each category; and outputting a warning message indicating that there is a major error in the test together with the test information when the test score is less than a preset value.

In addition, obtaining the first response may include: obtaining the first request from the transaction history; obtaining, from the first request, IP information and port information indicating the linked device, a business field indicated by the first request, and unique information indicating the first request; and obtaining the first response from the transaction history through a matching key determined using the IP information, the port information, the work field, and the unique information. In addition, the matching key may be determined through an operation of merging the IP information, the port information, the work field, and the unique information.

A virtual device for providing test information according to a second aspect of the present disclosure may include: a memory for storing a transaction history between an legacy computing device and a linked device, and a first request provided from the legacy computing device based on the transaction history and a first response received from the linked device in response to the first request, and a new second request corresponding to the first request; and a processor that obtains a second response corresponding to the second request by obtaining from a device, and provides test information for the new computing device based on a comparison result between the first response and the second response. In addition, the first request may include a full text including text listed according to a preset format.

In addition, the processor obtains IP information and port information indicating the virtual device from the second request, determines from the second request a business field indicated by the second request, and determines the second request from the second request. The unique information indicating the request may be obtained, and the second response may be obtained based on the IP information, the port information, the work field, and the unique information. Also, the first request may include a request transmitted from the legacy computing device to the linked device during a preset period in the past.

In addition, the processor obtains a plurality of first result values indicated by the first response and a plurality of second result values indicated by the second response. The test information determined based on the type and the error size may be acquired.

In addition, the processor categorizes the first result value according to the characteristics of the linked device, compares the first result value with the second result value for each category, and obtains an importance weight determined for each category and obtain the test information based on the importance weight and the comparison result for each category.

In addition, the importance weight may be determined according to the frequency of occurrence for each category appearing in the second result value.

In addition, the processor obtains the first request from the transaction history, and from the first request IP information and port information indicating the linked device, a business field indicated by the first request, and a unique identifier indicating the first request information may be obtained, and the first response may be obtained from the transaction history through a matching key determined using the IP information, the port information, the work field, and the unique information. In addition, the matching key may be determined through an operation of merging the IP information, the port information, the work field, and the unique information.

A system for providing test information according to a third aspect of the present disclosure includes: a database for storing a transaction history between an legacy computing device and a related art device; a new computing device for obtaining a first request provided from the legacy computing device based on the transaction history and a first response received from the linked device in response to the first request; and a virtual device that obtains a second request corresponding to the first request from a new computing device to obtain a second response corresponding to the second request, wherein the virtual device includes the first response and the second request. Test information for the new computing device may be provided based on the comparison result of the two responses.

A fourth aspect of the present disclosure may provide a computer-readable recording medium recording a program for executing the method according to the first aspect on a computer. Alternatively, the fifth aspect of the present disclosure may provide a computer program stored in a recording medium to implement the method according to the first aspect.

According to an embodiment of the present disclosure, by performing verification using a transaction occurring in a real transaction environment, it is possible to effectively perform a test for an outbound transaction.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method comprising:
    obtaining, by a processor of a virtual device, a transaction history between a legacy computing device and a linked device;
    obtaining, by the processor and based on the transaction history, a first request from the legacy computing device and a first response received from the linked device in response to the first request;
    receiving, by the processor, a second request corresponding to the first request from a new computing device;
    determining, by the processor, a second response to the second request; and
    determining test information for the new computing device based on comparing the first response and the second response,
    wherein determining the second response includes:
        obtaining internet protocol (IP) information and port information associated with the virtual device from the second request;
        determining, from the second request, a business field indicated by the second request;
        obtaining, from the second request, unique information representing the second request; and
        determining the second response based on the IP information, the port information, the business field, and the unique information.

2. The method of claim 1, wherein the first request includes a text in a particular format.

3. The method of claim 1, wherein the first request was sent from the legacy computing device to the linked device during a preset period.

4. The method of claim 1, wherein determining the test information includes:
    obtaining a plurality of first result values indicated by the first response and a plurality of second result values indicated by the second response; and
    determining the test information determined based on a type and an error size associated with one or more differences between the first result values and the second result values.

5. A method comprising:
    obtaining, by a processor of a virtual device, a transaction history between a legacy computing device and a linked device;
    obtaining, by the processor and based on the transaction history, a first request from the legacy computing device and a first response received from the linked device in response to the first request;
    receiving, by the processor, a second request corresponding to the first request from a new computing device;
    determining, by the processor, a second response to the second request; and
    determining test information for the new computing device based on comparing the first response and the second response,
    wherein determining the test information includes:
        obtaining a plurality of first result values indicated by the first response and a plurality of second result values indicated by the second response;

categorizing the first result values into one or more categories according to characteristics of the legacy computing device;

comparing the first result values and the second result values for each of the categories;

determining importance weights for the categories; and determining the test information based on a type and an error size associated with one or more differences between the first result values and the second result values, and based on the importance weights and the comparing of the first result values and the second result values for each the categories.

6. The method of claim 5, the importance weights are determined according to the frequency of occurrence for each of the categories in the second result values.

7. The method of claim 5, wherein determining the test information includes:

determining a test score based on the importance weights for the categories and differences between the first result value and the second result value for each of the categories; and when the test score is less than a preset value, outputting a warning message indicating with the test information.

8. A method comprising:

obtaining, by a processor of a virtual device, a transaction history between a legacy computing device and a linked device;

obtaining, by the processor and based on the transaction history, a first request from the legacy computing device and a first response received from the linked device in response to the first request;

receiving, by the processor, a second request corresponding to the first request from a new computing device;

determining, by the processor, a second response to the second request; and determining test information for the new computing device based on comparing the first response and the second response, wherein obtaining the first response includes:

obtaining the first request from the transaction history;

obtaining, from the first request, internet protocol (IP) information and port information indicating the linked device, a business field indicated by the first request, and unique information associated with the first request; and obtaining the first response from the transaction history through a matching key determined using the IP information, the port information, the business field, and the unique information.

9. The method of claim 8, wherein the matching key is generated by merging the IP information, the port information, the business field, and the unique information.

10. A device comprising:

a non-transitory computer readable memory to store instructions; and a processor that executes the instructions to:

obtain a transaction history between a legacy computing device and a linked device;

obtain, based on the transaction history, a first request provided from the legacy computing device and a first response received from the linked device in response to the first request;

receive a second request corresponding to the first request from a new computing device;

determine a second response corresponding to the second request; and generate test information for the new computing device based on comparing the first response and the second response, wherein the processor, when executing the instructions to determine the second response, is further to:

obtain internet protocol (IP) information and port information associated with the device from the second request;

determine a business field indicated by the second request;

obtain, from the second request, unique information indicative of the second request;

determine the second response based on the IP information, the port information, the business field, and the unique information.

11. The device of claim 10, wherein the first request includes text in a preset format.

12. The device of claim 10, wherein the first request is sent from the legacy computing device to the linked device during a preset period of time.

13. The device of claim 10, wherein the processor, when executing the instructions to generate test information for the new computing device, is further to:

obtain a plurality of first result values indicated by the first response and a plurality of second result values indicated by the second response; and determine the test information based on a type and an error size associated with one or more differences between the first result values and the second result values.

14. A device comprising:

a non-transitory computer readable memory to store instructions; and a processor that executes the instructions to:

obtain a transaction history between a legacy computing device and a linked device;

obtain, based on the transaction history, a first request provided from the legacy computing device and a first response received from the linked device in response to the first request;

receive a second request corresponding to the first request from a new computing device;

determine a second response corresponding to the second request; and generate test information for the new computing device based on comparing the first response and the second response, wherein the processor, when executing the instructions to generate test information for the new computing device, is further to:

obtain a plurality of first result values indicated by the first response and a plurality of second result values indicated by the second response;

categorize the first result values into one or more categories according to characteristics of the linked device;

compare the first result values and the second result values based on the categories;

determine importance weights for the categories; and determine the test information based on a type and an error size associated with one or more differences between the first result values and the second result values, and based on the importance weights and the comparing of the first result values and the second result values.

15. The device of claim 14, wherein the processor, when executing the instructions to determine the importance weights for the categories, is further to:
- determine the importance weights according to a frequency of occurrence for each of the categories in the second result values.

16. A device comprising:
- a non-transitory computer readable memory to store instructions; and
- a processor that executes the instructions to:
  - obtain a transaction history between a legacy computing device and a linked device;
  - obtain, based on the transaction history, a first request provided from the legacy computing device and a first response received from the linked device in response to the first request;
  - receive a second request corresponding to the first request from a new computing device;
  - determine a second response corresponding to the second request; and
  - generate test information for the new computing device based on comparing the first response and the second response,
- wherein the processor, when executing the instructions to obtain the first response, is further to:
  - obtain the first request from the transaction history;
  - obtain internet protocol (IP) information and port information indicating the linked device from the first request, a business field indicated by the first request, and unique information indicating the first request, and
  - obtain the first response from the transaction history using a matching key that is determined using the IP information, the port information, the business field, and the unique information.

17. The device of claim 16, wherein the matching key is generated by merging the IP information, the port information, the business field, and the unique information.

18. A system comprising:
- a first device including a first non-transitory memory that stores a transaction history between a legacy computing device and a linked device; and
- a second device including:
  - a second non-transitory memory to store instructions; and
  - a processor that executes the instructions such that the processor:
    - accesses the database to obtain, based on the transaction history, at least one first request provided from the legacy computing device and at least one first response received from the linked device in response to the at least one first request;
    - receives a second request corresponding to the at least one first request from a new computing device;
    - generates a second response to the second request; and
    - generates test information for the new computing device based on comparing the first response and the second response,
- wherein, when determining the test information, the processor:
  - obtains a plurality of first result values indicated by the first response and a plurality of second result values indicated by the second response;
  - categorizes the first result values into one or more categories according to characteristics of the legacy computing device;
  - compares the first result values and the second result values for each of the categories;
  - determines importance weights for the categories; and
  - determines the test information based on a type and an error size associated with one or more differences between the first result values and the second result values, and based on the importance weights and the comparing of the first result values and the second result values for each the categories.

\* \* \* \* \*